(12) United States Patent
Hoysak

(10) Patent No.: US 10,098,329 B2
(45) Date of Patent: *Oct. 16, 2018

(54) SQUIRREL RESISTANT DOME-SHAPED BIRD FEEDER PORT

(71) Applicant: WOODSTREAM CORPORATION, Lititz, PA (US)

(72) Inventor: Judith Kim Hoysak, Lancaster, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,805

(22) Filed: Aug. 5, 2016

(65) Prior Publication Data

US 2017/0311576 A1 Nov. 2, 2017

Related U.S. Application Data

(63) Continuation of application No. 13/632,330, filed on Oct. 1, 2012, now Pat. No. 9,414,574.

(51) Int. Cl.
*A01K 39/01* (2006.01)

(52) U.S. Cl.
CPC .................. *A01K 39/0113* (2013.01)

(58) Field of Classification Search
CPC .. A01K 5/0225; A01K 5/0233; A01K 5/0275; A01K 39/00; A01K 39/01; A01K 39/0113; A01K 39/12
USPC ............. 119/52.2, 52.3, 52.4, 53, 57.8, 57.9
See application file for complete search history.

(56) References Cited

U.S. PATENT DOCUMENTS

| | | | |
|---|---|---|---|
| 1,209,979 A | 12/1916 | Larson | |
| 3,794,386 A | 2/1974 | Hite | |
| 4,188,913 A | 2/1980 | Earl et al. | |
| 5,277,318 A | 1/1994 | Smalley et al. | |
| 5,568,789 A * | 10/1996 | Koenig | A01K 39/0113 119/57.9 |
| 5,609,306 A | 3/1997 | Siegel et al. | |
| 6,378,458 B1 * | 4/2002 | Boyd | A01K 39/0113 119/52.3 |
| 7,093,561 B2 * | 8/2006 | Rich | A01K 39/012 119/57.8 |
| 7,093,563 B1 | 8/2006 | Reynolds | |
| 7,261,056 B2 | 8/2007 | Hunter | |

(Continued)

FOREIGN PATENT DOCUMENTS

GB 2236468 4/1991

*Primary Examiner* — Lisa L Tsang
(74) *Attorney, Agent, or Firm* — Jacobson Holman, PLLC.

(57) ABSTRACT

A bird feeder is provided having a seed reservoir with a side wall that has at least one seed access opening and a squirrel resistant feed port assembly having a seed access restricter. The seed access restricter has a body with an inner opening in communication with the reservoir side wall opening and an outer seed access opening that is spaced away from the inner opening and the reservoir side wall opening while being in communication therewith. The outer seed access opening of the restricter is small enough and the length of the body is long enough that the squirrel resistant feed port assembly allows birds to access seed in the reservoir while blocking entry of the larger facial and head structure of a squirrel, thus preventing squirrels from gaining seed access.

17 Claims, 7 Drawing Sheets

(56) References Cited

U.S. PATENT DOCUMENTS

| | | | |
|---|---|---|---|
| D671,692 S | | 11/2012 | Carter |
| D677,016 S | * | 2/2013 | Carter ................. D30/127 |
| 2012/0006272 A1 | | 1/2012 | Colvin et al. |
| 2013/0255581 A1 | * | 10/2013 | Donegan ............... A01K 39/01 |
| | | | 119/57.8 |
| 2014/0076239 A1 | | 3/2014 | Vaughn et al. |

* cited by examiner

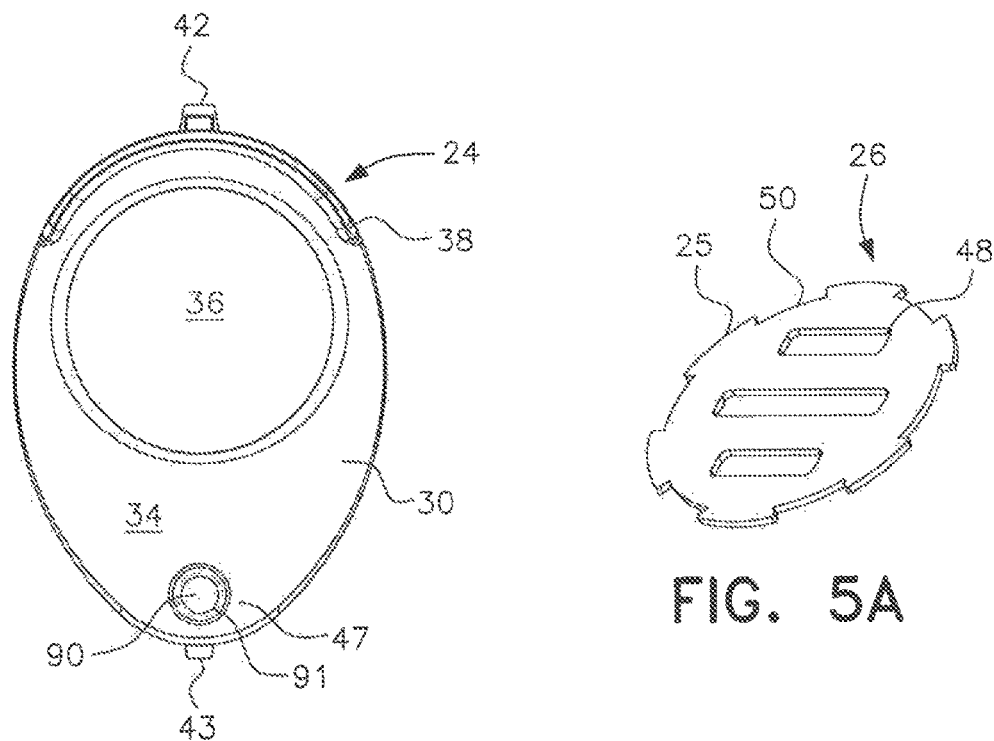
FIG. 4E
FIG. 5A
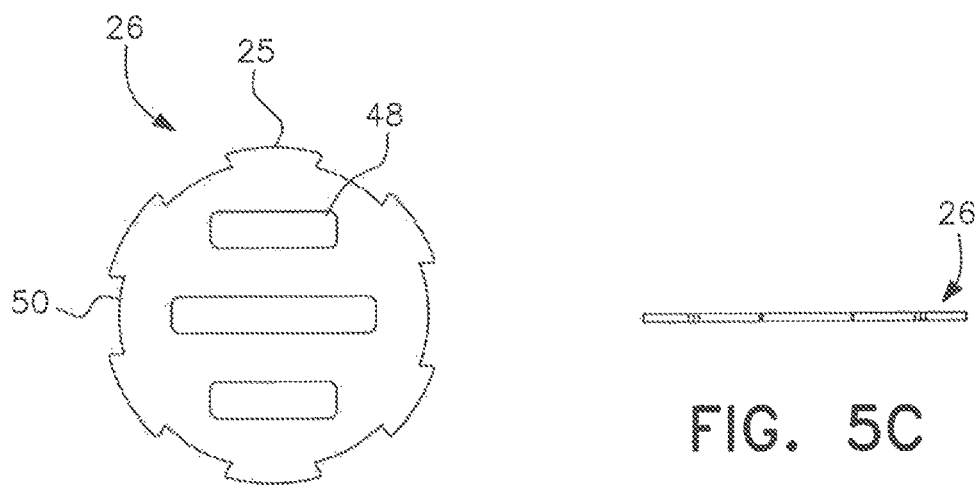
FIG. 5B
FIG. 5C

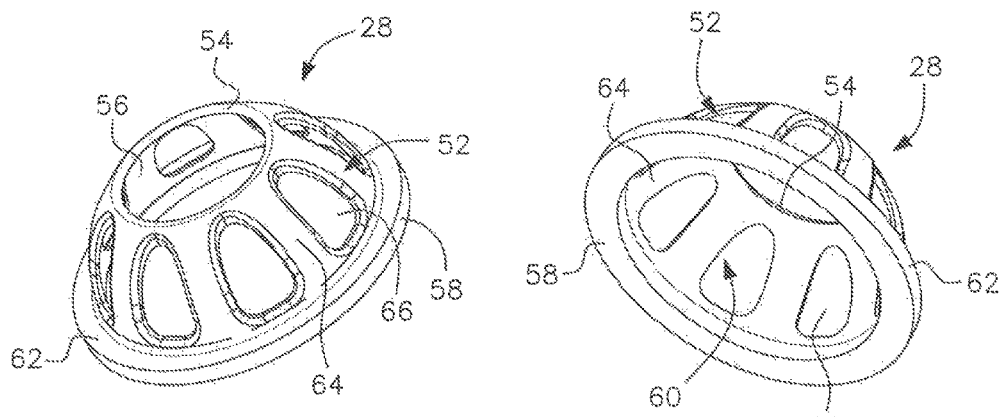
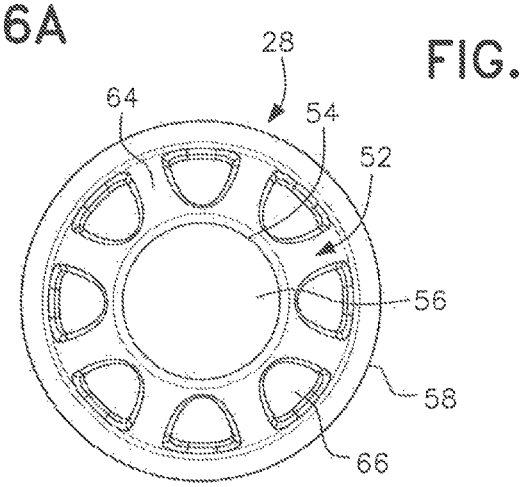
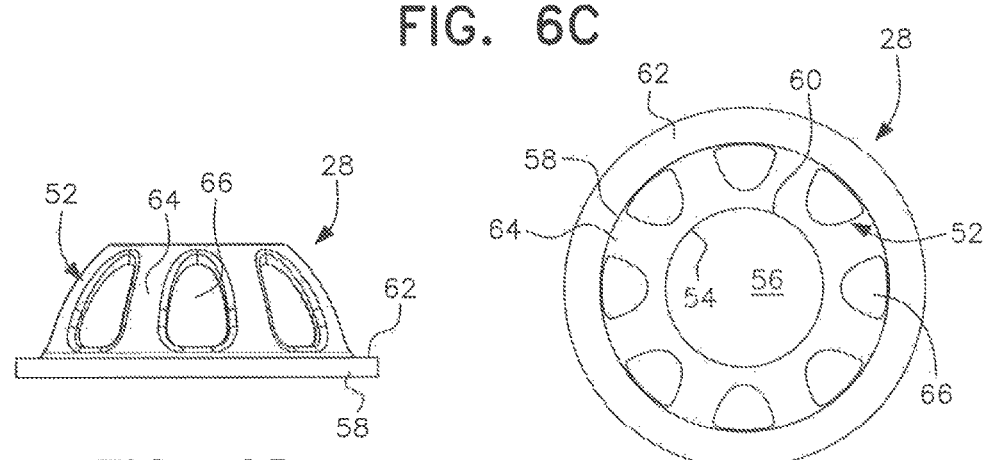
FIG. 6A  FIG. 6B  FIG. 6C  FIG. 6D  FIG. 6E

SQUIRREL RESISTANT DOME-SHAPED BIRD FEEDER PORT

This is a continuation application of application Ser. No. 13/632,330 filed on Oct. 1, 2012, and issuing as U.S. Pat. No. 9,414,574 on Aug. 16, 2016, the priority of which is hereby claimed.

FIELD OF THE INVENTION

The present invention generally relates to bird feeders for attracting and feeding wild birds. More particularly, the present invention concerns a feed port assembly configured to restrict squirrels from accessing seed in the feeder through the feed port and bird feeders including such port.

BACKGROUND OF THE INVENTION

Persons have long used bird feeders to attract birds of various types to their homes, both to view the birds and to feed the birds out of concern for their welfare in the event that food is scarce, as in winter.

Seed dispensing birdfeeders are also attractive to squirrels who can monopolize the feeder and prevent birds from gaining access to the seed. Various types of "squirrel proof" or at least squirrel resistant feeders have been developed in an effort to address this problem. Many involve quite complex electronically activated by the weight of the squirrel, or some other squirrel characteristic, to physically dislodge the squirrel from the feeder. While many of these feeders are effective, their complexity makes them expensive for the average consumer, both in terms of purchase and, when necessary, repair. Therefore, a need exists for a simpler squirrel resistant mechanism that prevents squirrels from eating all of the bird seed.

SUMMARY OF THE INVENTION

Accordingly, the present invention is directed to a bird feeder having a seed reservoir with at least one seed access opening in the sidewall of the reservoir through which birds can access seed held in the reservoir. Fitted within the seed access opening is a squirrel resistant feed port assembly.

The squirrel resistant feed port assembly includes a base, a rear panel and a seed access restricter.

The base has a mounting body configured to couple the base to the reservoir side wall, a flange that projects inwardly from the rear side of the mounting body and defines a central opening, and a perch assembly. The mounting body is shaped so that its inner side generally conforms to the shape of the feed reservoir outside wall around the access opening. The flange is inserted through the reservoir seed access opening and projects into the interior of the reservoir when the feed port is mounted to the reservoir sidewall. The perch assembly includes a perch rod having an insertion end configured to secure the perch assembly to the base mounting body.

The mounting body further includes coupling structures on its upper and lower ends to secure the base to the reservoir side wall. The coupling structure on the upper end is an upwardly extending upper tab that is received in a corresponding notch formed in the upper end of the sidewall opening. The coupling structure on the lower side is formed by a downwardly extending lower tab which engages in a corresponding base mounting aperture in the reservoir side wall so that the lower tab abuts the inner surface of the reservoir side wall.

The rear panel has at least one seed aperture formed therein and is sized to be coupled to the rear of the flange. The rear panel blocks a part or most of the flange central opening and the reservoir seed access opening, restricting an unwanted outward flow of seed while allowing birds to access seed in the reservoir through one or more seed apertures in the rear panel.

The seed access restricter is in communication with the reservoir side wall opening and has an inner end adjacent the reservoir side wall opening, a hollow body having sidewalls projecting outwardly from the inner end, and an outer end distal from the inner end. The sidewalls extend between the inner end and the distal outer end and are formed by a plurality of spaced bars, to provide radial openings between the adjacent spaced bars that can be used as seed access openings. The inner end has a first aperture therein at least partially aligned with the reservoir side wall opening, and the distal outer end has a second aperture that serves as a seed access opening. The configuration of the seed access restricter enables a bird to access seed in the reservoir by extending its beak through the seed access opening formed by the second aperture or through one of the radial openings between the restricter spaced bars, through the hollow body and then to the first aperture adjacent the reservoir side wall opening. If necessary, a feeding bird could extend its head through the seed access opening in the outer end of the restricter. The facial construction of a squirrel's head, however, is much larger and broader than that of a bird. As a result, a squirrel is unable to insert its nose or jaw far enough into the radial openings or the second aperture and the hollow body to reach the first aperture and the reservoir side wall opening.

In the illustrated embodiment, the outwardly projecting sidewalls of the seed access restricter form a dome-shaped cage. The dome-shaped cage has a first annular ring that defines the first aperture of the seed access restricter at the inner end of the cage. The first aperture is generally circular but could have other shapes. A second annular ring defines the second aperture at the distal outer end of the seed access restricter. The second aperture is also generally circular, although other shapes could be used. The first aperture in the inner end of the cage is larger than the second aperture defined by the second annular ring and includes an outwardly directed flange or rim. The sides of the cage are defined by the plurality of spaced bars that extend between the two annular rings with openings being defined between the spaced bars. While the sides of the cage could alternatively be made solid, rather than with openings as shown in the illustrated embodiment, the openings created by the spaced bars expose more seed, thereby attracting more birds. In addition, the openings allow for drainage of water and also provide for air flow adjacent the reservoir sidewall opening.

Finally, in the illustrated embodiment, the base is also provided with an upper canopy extending outwardly from the front of the mounting body above the dome-shaped cage to deflect precipitation, tree debris, and the like.

When the feed port assembly is secured to the bird feeder, the base is mounted to the reservoir side wall. The dome-shaped cage of the seed access restricter is inserted from the rear side of the base, outer ring end first, and through the flange central opening until the rim is in abutment with the rear side of the mounting body and the dome-shaped cage projects outwardly from the mounting body. The rear panel is then placed in abutment against the back of the flange and secured thereto by fastening elements, glue or adhesive or other fastening means, so that the rim of the seed access restricter is captured between the rear side of the mounting body and the front side of the rear panel.

According to alternative embodiments, the squirrel resistant feed port assembly of the present invention may be assembled as a two-part assembly. As one example, the cage and the mounting body may be integrally formed as a unit which is fitted within the reservoir sidewall opening, with the rear panel then being attached to an inner surface of the mounting body. According to another example, the base could be molded as part of the seed reservoir side wall. In this case, the cage would be provided with tabs or similar fastening elements to secure the cage to the molded base. The rear panel could either be a separate element or formed integrally with the inner end of the cage. As a still further embodiment, with appropriate sizing and configuration of the cage and rear panel elements, the base, cage and rear panel could be formed as a single unit that is inserted into the reservoir sidewall opening and secured thereto with the tabs on the base mounting portion of the unit. The present invention is intended to include all such variations in construction by which a squirrel resistant feed port assembly of the type as described herein may be configured.

In view of the foregoing, it is an object of the present invention to provide a bird feeder having a reservoir with a side wall opening fitted with a squirrel resistant feed port assembly that has at least one seed access opening spaced away from the reservoir sidewall that is large enough for a bird to insert its beak and/or head therethrough to gain access to seed in the seed reservoir, while the opening is too small for a squirrel to insert its face to gain seed access.

Another object of the present invention is to provide a squirrel resistant feed port assembly in accordance with the preceding object in which the feed port assembly has a plurality of seed access openings defined by an outwardly projecting seed access restricter that sizes and spaces the access openings away from the reservoir side wall opening, the sizing and spacing of the restricter seed access openings being such as to prevent a squirrel from inserting its teeth or face far enough into any of the access openings to gain access to the reservoir side wall opening.

Yet another object of the present invention is to provide a squirrel resistant feed port assembly in accordance with the preceding objects in which the seed access restricter is in the form of a dome-shaped cage that includes a plurality of spaced bars extending between an inner ring at the rear or inner edge of the cage and an outer ring at the outer end of the cage.

A further object of the present invention is to provide a squirrel-resistant feed port assembly in accordance with the preceding objects in which the plurality of spaced bars which define the side wall or walls of the dome-shaped cage and the outer ring at the outer end of the cage provide access openings which are sized and spaced away from the rear panel of the assembly such that birds can access seed in the feeder reservoir through the cage and rear panel access openings, but squirrels cannot.

Still another object of the present invention is to provide a squirrel resistant feed port assembly in accordance with the preceding objects in which the feed port assembly further includes a base for mounting the feed port assembly to the seed reservoir and a rear panel for securing the seed access restricter to the base.

A still further object of the present invention is to provide a squirrel resistant feed port assembly in accordance with the preceding objects in which the rear edge of the cage inner ring includes an outwardly directed flange or rim that is captured between a front side of the rear panel and a rear side of the base to lock the seed access restricter in place between the outer edge of the rear panel and the inner edge of the reservoir wall around the reservoir opening when the rear panel is fastened to the base.

Yet a further object of the present invention is to provide a squirrel resistant feed port assembly in accordance with the preceding objects that is not complex in structure, which can be manufactured at low cost but yet efficiently restricts squirrel access to seed intended for birds in a bird feeder, and which can be readily mounted in a sidewall opening of a bird feeder reservoir.

The foregoing objects together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE FIGURES

FIG. 4E is a front view of the mounting body shown in FIGS. 4A-4D.

FIG. 5A is a front perspective view of the rear panel shown in FIG. 3.

FIG. 5B is a front view of the rear panel shown in FIG. 5A.

FIG. 5C is a side view of the rear panel shown in FIGS. 5A and 5B.

FIG. 6A is a front perspective view of the seed access restricter shown in FIG. 3.

FIG. 6B is a rear perspective view of the seed access restricter shown in FIG. 6A.

FIG. 6C is a front view of the seed access restricter shown in FIGS. 6A and 6B.

FIG. 6D is a side view of the seed access restricter shown in FIGS. 6A-6C.

FIG. 6E is a rear view of the seed access restricter shown in FIGS. 6A-6D.

DETAILED DESCRIPTION OF THE PREFERRED EMBODIMENTS

Figure 1:
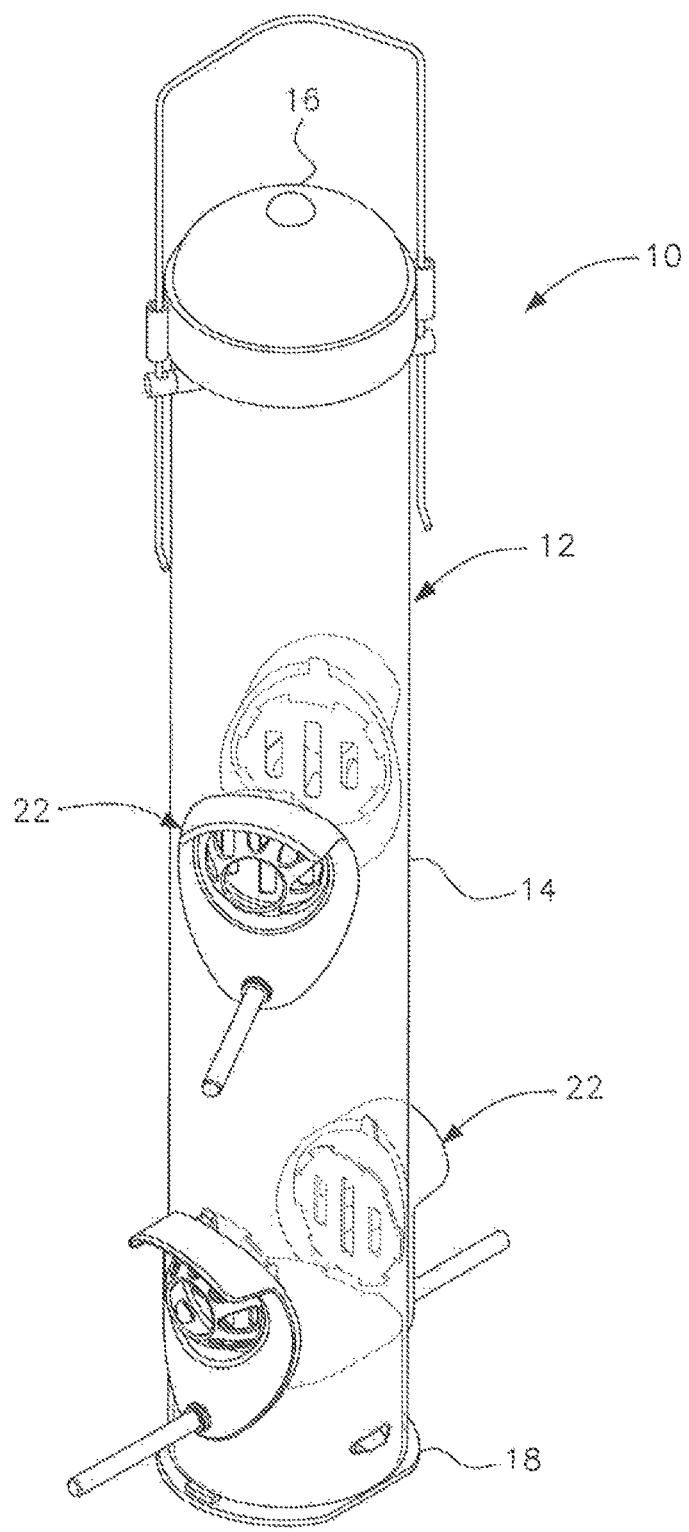
FIG. 1 is a perspective view of a bird feeder with a plurality of squirrel resistant feed port assemblies in accordance with the present invention.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As used herein, "front" or "outer" side or end refers to the side or end of a component that faces outwardly with respect to the interior of the seed reservoir of the bird feeder when the feeder is assembled. Conversely, "rear" or "inner" side or end refers to the opposite side or end, namely the side or end that faces or is closest to the interior of the seed reservoir of the bird feeder. The terms "upwardly" and "downwardly" are made with reference to the top and bottom of the feeder, respectively.

As shown in FIG. 1, according to a first embodiment the present invention is directed to a bird feeder generally designated by reference numeral 10. The bird feeder has a reservoir generally designated by reference numeral 12 with a side wall 14 for holding seed, a cover 16 and a feeder base 18. The reservoir side wall 14 has at least one reservoir side wall opening 20 (see FIG. 2A) that allows for seed access through the side wall of the reservoir. Fitted within each of the sidewall openings 20 is a squirrel resistant feed port assembly generally designated by reference numeral 22.

Figure 2A:
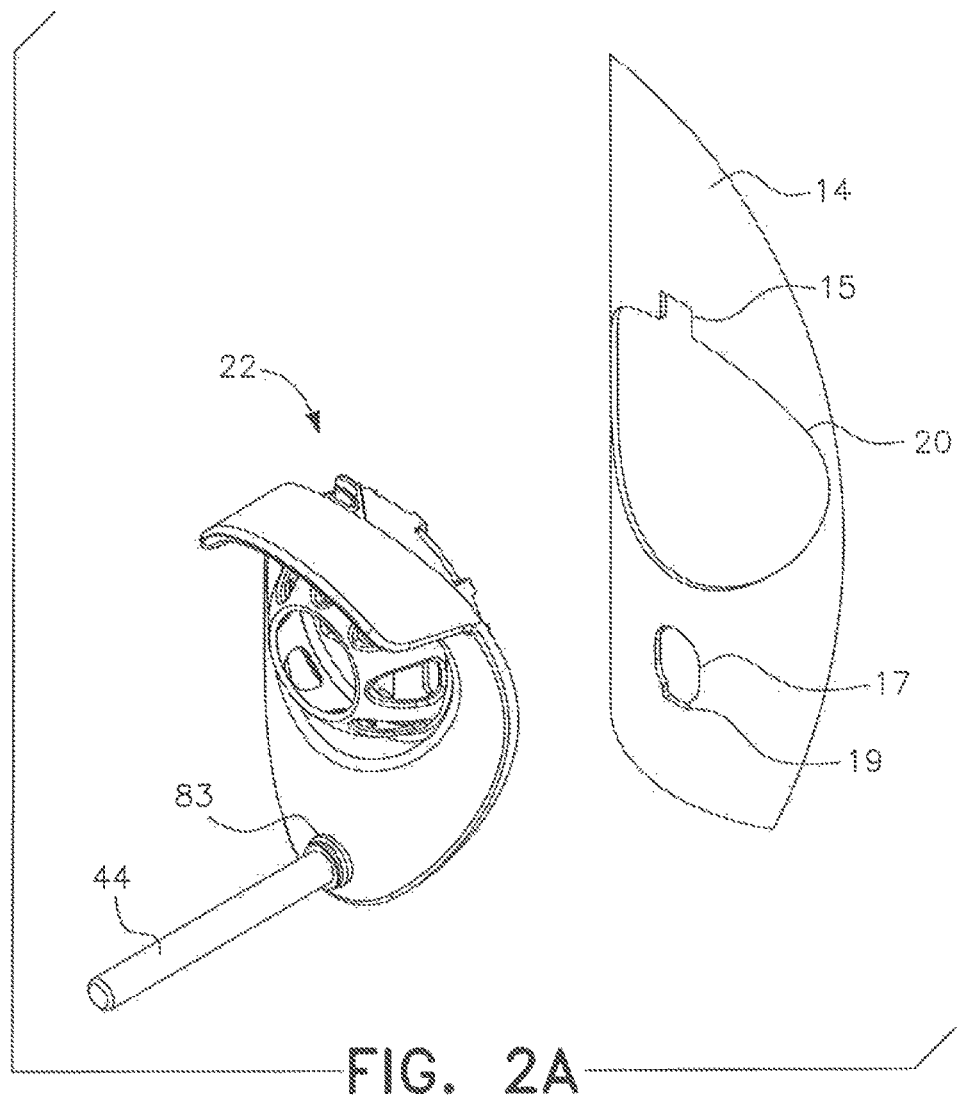
FIG. 2A is a partially exploded view of one of the squirrel resistant feed port assemblies shown in FIG. 1 showing the relationship between the port assembly and the reservoir sidewall when separated.
Figure 2B:
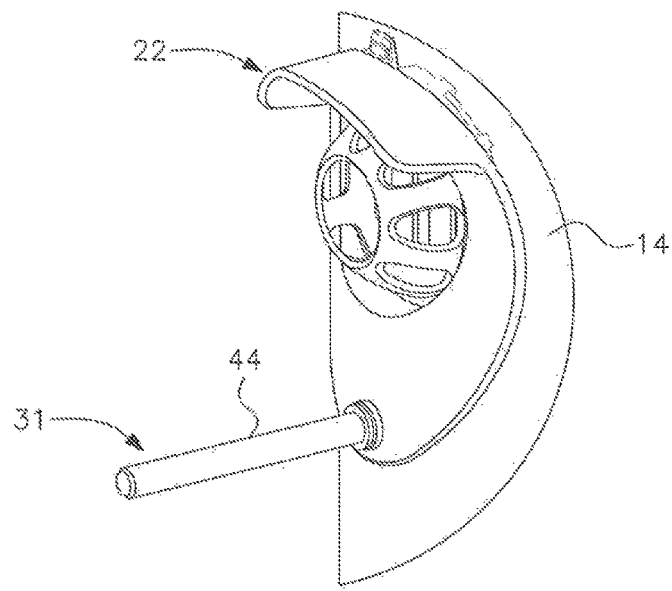
FIG. 2B is a perspective view of the squirrel resistant feed port assembly and reservoir sidewall shown in FIG. 2A when assembled.

FIG. 2A illustrates one of the feed port assemblies 22 shown in FIG. 1, as separated from the reservoir sidewall 14, a portion of which sidewall is shown in an exploded configuration with the feed port assembly. FIG. 2B illustrates the feed port assembly 22 and reservoir side wall 14 shown in FIG. 2A when the port is mounted to the sidewall.

As can be seen in FIG. 2A, a notch 15 is formed in the upper edge of each of the reservoir sidewall openings 20 and a base mounting aperture 17 is spaced below the lower edge of the sidewall opening. The base mounting aperture 17 is generally oval with a notch 19 at the base. The notch 15 and the base mounting aperture 17 and notch 19 are configured to receive coupling structures on the squirrel resistant feed port assembly 22 as will be described hereinafter.

Figure 3:
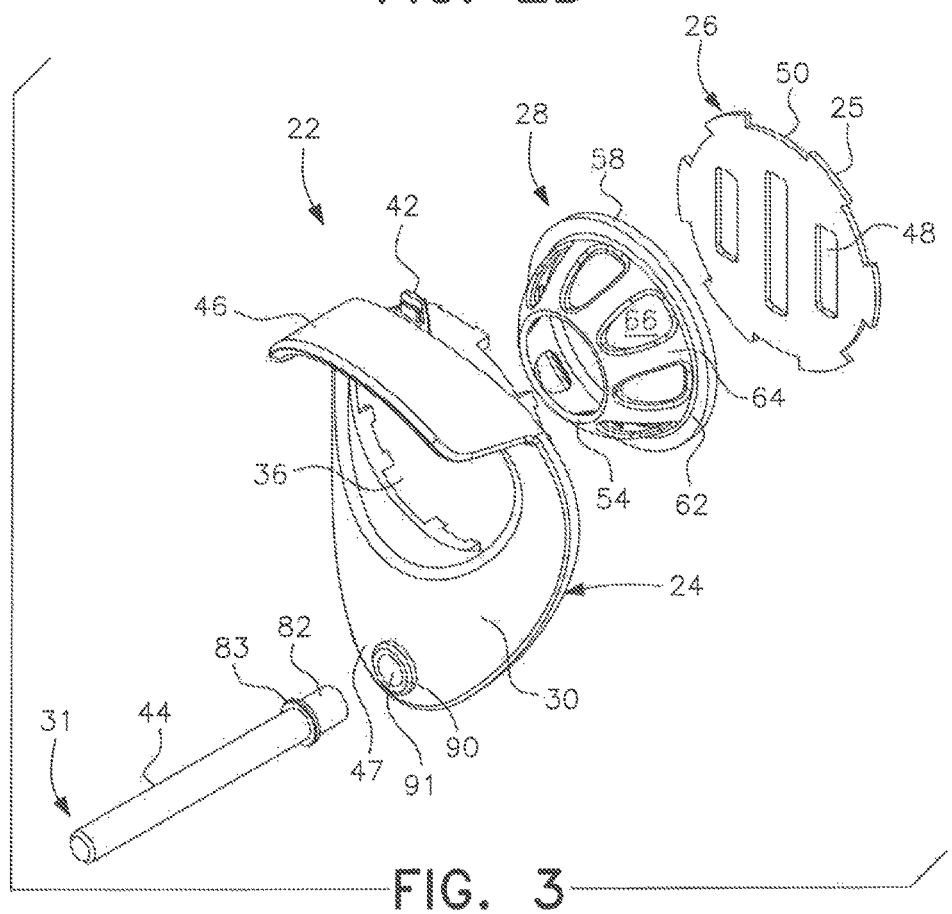
FIG. 3 is an exploded view of the components of the squirrel resistant feed port assembly shown in FIG. 2.
Figure 4A:
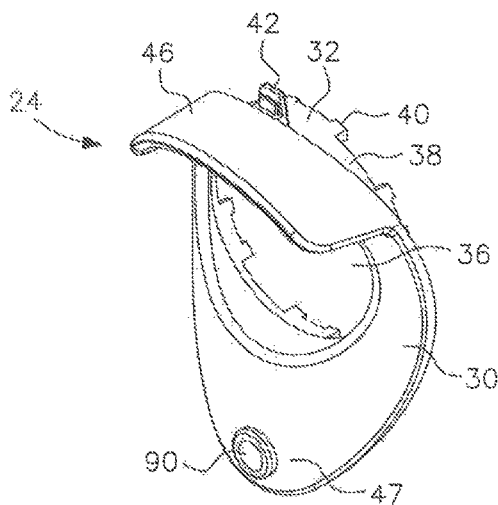
FIG. 4A is a front perspective view of the mounting body shown in FIG. 3.
Figure 4B:
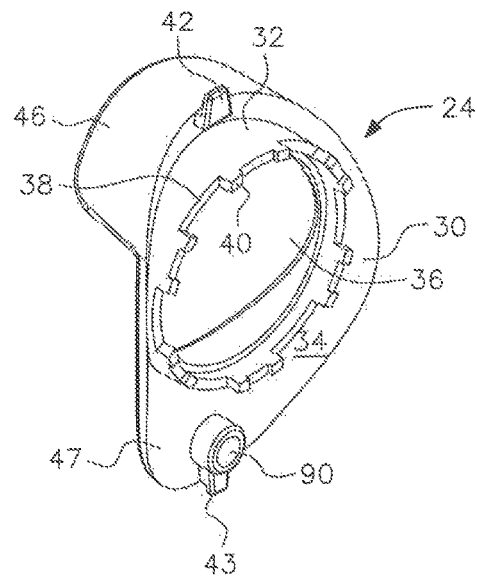
FIG. 4B is a rear perspective view of the mounting body shown in FIG. 4A.
Figure 4C:
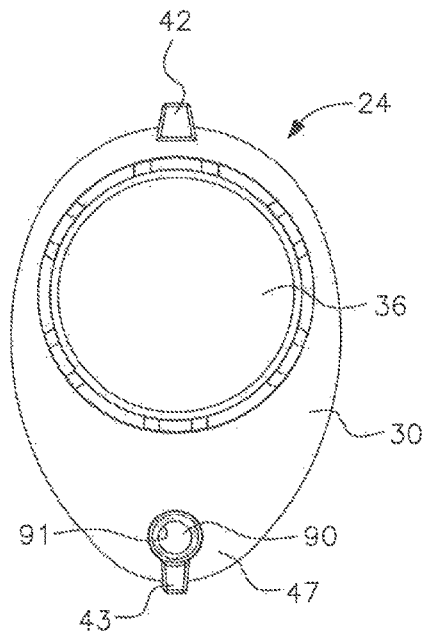
FIG. 4C is a rear view of the mounting body shown in FIGS. 4A and 4B.
Figure 4D:
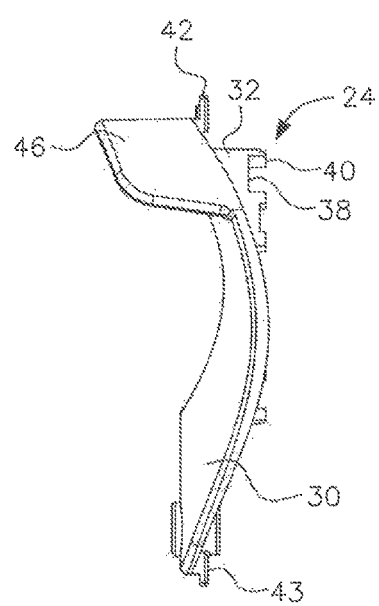
FIG. 4D is a side view of the mounting body shown in FIGS. 4A-4C.

As shown in the enlarged views of FIGS. 2A and 2B and the exploded view of FIG. 3, the feed port assembly 22 includes a base generally designated by reference numeral 24, a rear panel generally designated by reference numeral 26, and a seed access restricter generally designated by reference numeral 28. Each of the base 24, the rear panel 26 and the seed access restricter 28 are preferably made of metal. While it is possible to use other materials such as hard plastic, squirrels are notoriously persistent in chewing through all but the most durable of materials.

In the illustrated embodiment and as shown in greater detail in FIGS. 4A-4E, the base 24 has a mounting body 30, a flange 32 and a perch assembly generally designated by reference numeral 31. The rear side 34 of the mounting body 30 is preferably shaped to conform to the outer side of the reservoir wall 14 around the side wall opening 20. The lower end 47 of the base mounting body 30 has an aperture 90 formed therein that aligns with the base mounting aperture 17 in the reservoir side wall and receives the perch assembly 31 as will be described hereinafter.

The flange 32 projects inwardly from the rear side 34 of the mounting body 30 and is inserted through the reservoir sidewall opening 20 into the interior of the reservoir 12 when the feed port 22 is mounted to the reservoir sidewall 14. The flange 32 defines a central opening 36 in communication with the sidewall opening 20. The rear edge 38 of the flange 32 has axially extending fastening elements such as arcuate tabs 40 that are used to secure the rear panel 26 to the flange 32 as will be described hereinafter.

The mounting body 30 further includes two coupling structures to secure the base 24 to the reservoir side wall 14. In the illustrated embodiment, the first coupling structure is an upper tab 42 that extends upwardly from the top end of the base mounting body 24 and is received in the corresponding notch 15 formed in the upper edge of the sidewall opening 20. The second coupling structure is a downwardly directed tab 43 that is received in the notch 19 of the base mounting aperture 17 in the reservoir sidewall.

The perch assembly 31 includes a perch rod 44 having an insertion end 82 separated from the remainder of the rod 44 by a ridge 83. As shown, the ridge is annular and extends fully around the rod. The ridge does not have to be continuous, however, and may have other shapes. The insertion end 82 is received within the aligned base aperture 90 and reservoir base mounting aperture 17 with the insertion end 82 positioned at least partly inside the reservoir and the ridge 83 in abutment with an outer surface of the base mounting body. According to the illustrated embodiment, the insertion end 82 of the perch rod 44 and the inner surface 91 of the aperture 90 are threaded, allowing the perch assembly to be threadedly engaged with the base mounting body. Other means for securing the perch assembly 31 to the base mounting body could also be used as would be understood by persons of ordinary skill in the art.

In the illustrated embodiment, the base also includes an outwardly extending canopy or hood 46 over the seed access restricter 28 and the flange central opening 36 to protect the seed from precipitation, tree debris, and the like.

As shown in FIGS. 5A-5C, the rear panel 26 is sized to be coupled into or against the rear or back edge 38 of the flange 32. Epoxy or other strong adhesive may be used to fix the panel to the back edge of the flange. According to the illustrated embodiment, the panel is locked into position by displacing the arcuate tabs 40 under a force sufficient to splay the material and lock the panel in place, as by swaging. At least one seed aperture 48 is formed in the rear panel 26; in the illustrated embodiment, three longitudinally extending seed apertures 48 are provided. When coupled to the base 24, the rear panel 26 blocks a part or most of the flange central opening 36 and the reservoir side wall opening 20, restricting an unwanted outward flow of seed while allowing birds to access seed in the reservoir through the seed aperture or apertures 48 in the rear panel.

The perimeter 25 of the rear panel 26 has a plurality of notches 50. The tabs 40 on the flange 32 are interdigitatingly received within the notches 50 on the rear panel 26 and secured thereto adjacent the base 24 using an adhesive. Preferably, the arcuate tabs are lightly swaged to displace them. Specifically, because of the close fit between the panel and its mating features, displacement of any of the tabs creates a locking phenomenon. The swaging may be accomplished using an appropriate shaped implement to apply a forceful blow sufficient to displace the material and thereby lock the rear panel in place.

As shown in FIGS. 6A-6E, the seed access restricter 28 is an outwardly projecting structure that, in the illustrated embodiment, is a dome-shaped cage generally designated by reference numeral 52. An inner end of the cage has an annular inner ring 58 defining a first generally circular opening 60. An outer end of the cage has an annular outer ring 54 defining a second generally circular opening 56. The opening 56 formed by the outer ring 54 is smaller than the opening 60 defined by the inner ring 58. The inner ring 58 includes an outwardly directed flange or rim 62. According to one embodiment, the outer ring has a diameter of between about one half inch to about eleven sixteenths of an inch, and is preferably about 0.660 inches. The size of the inner ring is largely dependent upon the size of the flange opening and reservoir side opening, but is generally about one inch to about one and three-quarters inches in diameter.

The sides of the cage are formed by a plurality of spaced bars 64 that extend between the inner ring 58 and the outer ring 54 and are separated by apertures 66. The length of the cage as between the inner ring 58 and the outer ring 54 is about three eighths to about nine sixteenths of an inch, more preferably about one half inch to about five eighths of an inch, and most preferably about 0.550 inches. Even if a small squirrel is able to insert its nose through the outer ring 54, the length of the bars 64 prevents the squirrel from inserting his head far enough into the cage to reach the inner ring 58. The apertures 66 are sized and spaced away from the rear panel 26 to allow birds to gain access to seed in the reservoir 14 through seed apertures 48, while the size and spacing prevent a squirrel from similarly accessing the seed in reservoir 14.

While alternatives are not shown herein, the seed access restricter is not limited to the dome-shaped cage shown but may have alternate shapes provided the shape and length thereof allows a bird to insert its beak and/or head into the restricter through the outer opening 56 and/or side apertures 66 and the body of the restricter to gain access to the seed in the reservoir while, at the same time, such shape and/or length prevent squirrels from accessing the reservoir opening.

To assemble the feed port assembly 22, the base 24 is secured within the reservoir side wall opening 20 by placing the upper tab 42 in the notch 15 to secure the top end of the base to the reservoir. The aperture 90 in the base mounting body is aligned with the base mounting aperture 17 and the insertion end 82 of the perch rod 44 is inserted through the aligned apertures 90 and 17. The lower tab 43 on the base mounting body is secured within the notch 19 and into abutment with the inner surface of the reservoir and locks the lower end 47 of the base mounting body to the reservoir side wall.

Figure 7:
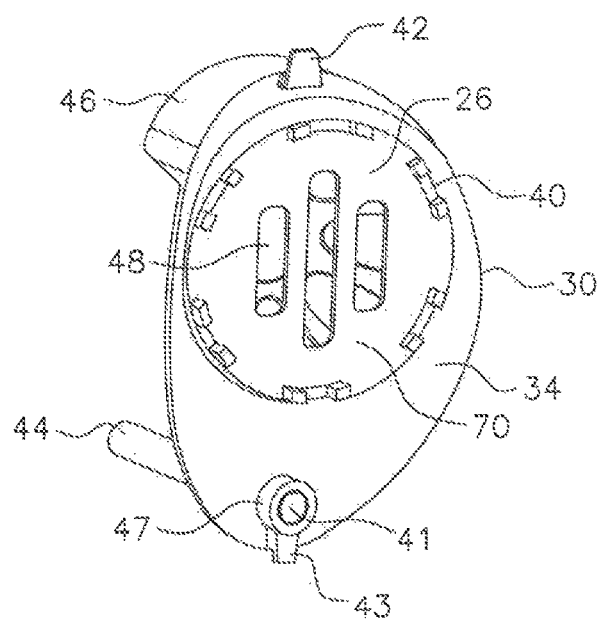
FIG. 7 is a rear perspective view of the components of the squirrel resistant feed port assembly shown in FIG. 3 as assembled.
Figure 8:
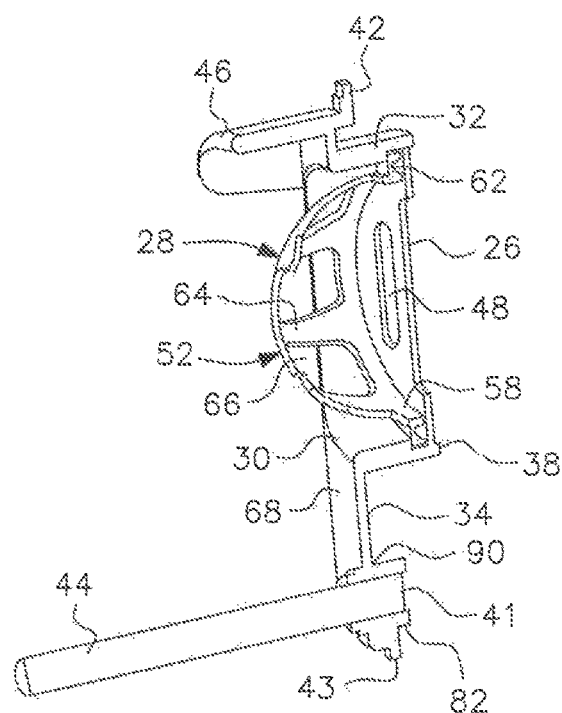
FIG. 8 is a cutaway perspective side view of the feed port assembly shown in FIG. 7.

The dome-shaped cage 52 of the seed access restricter 28 is inserted, outer ring 54 first, into the rear side 34 of the base 24 through the flange central opening 36 until the rim 62 is in abutment with the rear side 34 of the mounting body 30 and the dome-shaped cage 52 projects outwardly from the front side 68 of the mounting body. The rear panel 26 is then secured to the back edge 38 of the flange 32 by interdigitatingly aligning the tabs 40 on the flange 32 with the notches 50 of the rear panel 26 and gluing or otherwise securing the rear panel 26 to the flange so that the perimeter 25 and the notches 50 of the panel contact the rear side 70 of the rear panel 26 as shown in FIG. 7. The rim 62 of the seed access restricter 28 is thereby captured between the rear side 34 of the mounting body 30 and the front side 72 of the rear panel 26 as shown in the cutaway view of FIG. 8. The rear panel and flange are secured to one another using glue or other fastening method. As would be understood by persons of skill in the art, other means of attaching the components could also be used.

Once assembled and mounted to the reservoir as shown in FIGS. 1 and 2B, the access opening formed by the outer ring of the dome-shaped cage is large enough for birds to insert their beaks and in many cases, the front of their heads through the access opening, to reach the seed aperture in the rear panel and thereby the seed contained in the reservoir. The facial construction of a squirrel's head is much larger and broader than that of a bird. As a result, a squirrel is unable to insert its nose or its paws far enough into the outer ring of any access openings that may be formed in the sidewalls of the cage to reach the seed behind the rear panel seed aperture.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A bird feeder comprising:
a seed reservoir having a side wall with at least one opening therein through which birds can access seed held in an interior of the reservoir; and
a squirrel resistant feed port assembly having a seed access restricter in communication with the reservoir side wall opening, said seed access restricter including a hollow body having an inner end adjacent the at least one reservoir side wall opening and an outer end distal from said seed reservoir interior, said hollow body being defined by a plurality of sidewalls that project from the hollow body inner end outwardly away from the seed reservoir to said hollow body outer end, said hollow body inner end having a first aperture therein at least partially aligned with said at least one reservoir side wall opening, said hollow body outer end having a second aperture, said second aperture being spaced away from said first aperture by said sidewalls, said sidewalls being formed by a plurality of spaced bars that extend from the hollow body inner end to the hollow body outer end with spacing between the bars forming apertures in the sidewall, the bars and apertures creating a cage that shields the at least one reservoir side wall opening, said seed access restricter enabling a bird to access the seed in the interior of said reservoir by extending its beak through the second aperture, through the hollow body and then to the first aperture adjacent the at least one reservoir side wall opening, said second aperture being too small for a squirrel to insert its face therethrough to gain access to the seed in said reservoir interior.

2. The bird feeder as set forth in claim 1, wherein a length of the hollow body between the inner and outer ends thereof is too long for the squirrel to insert its face far enough into the seed access restricter to gain seed access.

3. The bird feeder as set forth in claim 2, wherein the length of said seed access restricter hollow body is between about three eighths of an inch and about five eighths of an inch.

4. The bird feeder as set forth in claim 1, wherein the second aperture at the outer end of the hollow body has a diameter of between about one half inch and about eleven sixteenths of an inch.

5. The bird feeder as set forth in claim 1, wherein the first aperture at the inner end of the hollow body has a diameter that is approximately equal to a diameter of the at least one reservoir side wall opening, said feed port assembly further comprising a panel associated with said first aperture, said panel covering part of the at least one reservoir side wall opening to prevent unobstructed outward flow of the seed from the interior of the reservoir and having at least one seed access opening therein.

6. The bird feeder as set forth in claim 5, wherein said feed port assembly includes a base fitted within said at least one reservoir side wall opening, said base including a flange extending into the interior of said reservoir, said panel being coupled to said flange.

7. The bird feeder as set forth in claim 6, wherein said first aperture is defined by an inner ring that includes a rim that is sandwiched between a rear edge of the base flange and the panel to secure the seed access restricter when the panel is coupled to the base flange.

8. The bird feeder as set forth in claim 1, wherein said feed port assembly further comprises a panel substantially covering said at least one reservoir side wall opening, said panel having at least one seed aperture therein that defines a seed access open area into said seed reservoir, said seed access open area being smaller than said at least one reservoir side wall opening to restrict an unwanted outward flow of the seed from the reservoir interior while providing access to the seed in the reservoir interior through the at least one seed aperture in the panel.

9. The bird feeder as set forth in claim 8, wherein said feed port assembly further comprises a base mounted to the seed reservoir side wall, said panel being adjacent a rear side of the base, said seed access restricter being fitted within an opening in the base, said base including a mounting body configured to couple the base to the reservoir side wall, and a flange that projects rearwardly from a back side of the mounting body and that extends through the at least one reservoir side wall opening, the flange defining a central opening in communication with the seed contained in the seed reservoir.

10. The bird feeder as set forth in claim 9, wherein the panel is flat and is sized to be coupled to a rear edge of the flange.

11. The bird feeder as set forth in claim 10, wherein the flange has rearwardly extending radially spaced fingers and the panel has a plurality of notches that interdigitatingly cooperate with the fingers to secure the panel to the flange.

12. The bird feeder as set forth in claim 10, wherein the at least one seed aperture in said flat panel has a fixed size that is not adjustable.

13. The bird feeder as set forth in claim 10, wherein the second aperture of the seed access restricter hollow body distal from the reservoir interior is smaller than the first aperture of said seed access restricter hollow body adjacent the seed reservoir side wall.

14. The bird feeder as set forth in claim 8, wherein the panel has a fixed orientation and a size of said seed access open area is not adjustable.

15. The bird feeder as set forth in claim 8, wherein the panel has a plurality of apertures formed therein in communication with said at least one reservoir side wall opening, said plurality of apertures together defining said seed access open area.

16. The bird feeder as set forth in claim 15, wherein a length of said hollow body of said seed access restricter is between about three eighths of an inch and about five eighths of an inch, and the second aperture of the seed access restricter hollow body has a diameter of between about one half inch and about eleven sixteenths of an inch.

17. The bird feeder as set forth in claim 1, wherein said cage is dome shaped.

* * * * *